United States Patent
Eisenberger et al.

(10) Patent No.: US 7,716,847 B2
(45) Date of Patent: May 18, 2010

(54) PROBE SYSTEM AND METHOD FOR OPERATING A PROBE SYSTEM

(75) Inventors: Christian Eisenberger, Rubpolding (DE); Klaus Groell, Waging (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 62 days.

(21) Appl. No.: 12/260,666

(22) Filed: Oct. 29, 2008

(65) Prior Publication Data
US 2009/0126214 A1 May 21, 2009

(30) Foreign Application Priority Data
Nov. 16, 2007 (DE) ........................ 10 2007 054 838

(51) Int. Cl.
*G01B 5/012* (2006.01)
(52) U.S. Cl. .......................................... 33/558; 33/561
(58) Field of Classification Search .................. 33/558, 33/556, 559, 561
See application file for complete search history.

(56) References Cited

U.S. PATENT DOCUMENTS

| | | | | |
|---|---|---|---|---|
| 5,056,235 | A * | 10/1991 | Thomas | 33/503 |
| 6,860,026 | B2 * | 3/2005 | Fuge | 33/556 |
| 6,951,060 | B2 * | 10/2005 | Groell | 33/558 |
| 7,464,483 | B2 * | 12/2008 | Schopf et al. | 33/558 |
| 7,546,690 | B2 * | 6/2009 | Groell et al. | 33/558 |
| 2007/0006473 | A1 * | 1/2007 | Schopf et al. | 33/558 |
| 2008/0110039 | A1 | 5/2008 | Groell et al. | |

FOREIGN PATENT DOCUMENTS

DE   10 2006 054 978   5/2008

* cited by examiner

*Primary Examiner*—Christopher W Fulton
(74) *Attorney, Agent, or Firm*—Kenyon & Kenyon LLP

(57) ABSTRACT

A probe system includes a probe head and a transceiver element. Due to contact of a stylus, a sensor signal is able to be generated by a sensor element. The probe head and the transceiver element are configured such that a wireless data transfer is able to be produced between them, so that readiness information is transmittable from the probe head to the transceiver element. The readiness information is transmittable by two bit strings including high bits and low bits, the bit strings being transmittable following defined time intervals, and the second bit string having fewer high bits than the first bit string.

18 Claims, 3 Drawing Sheets

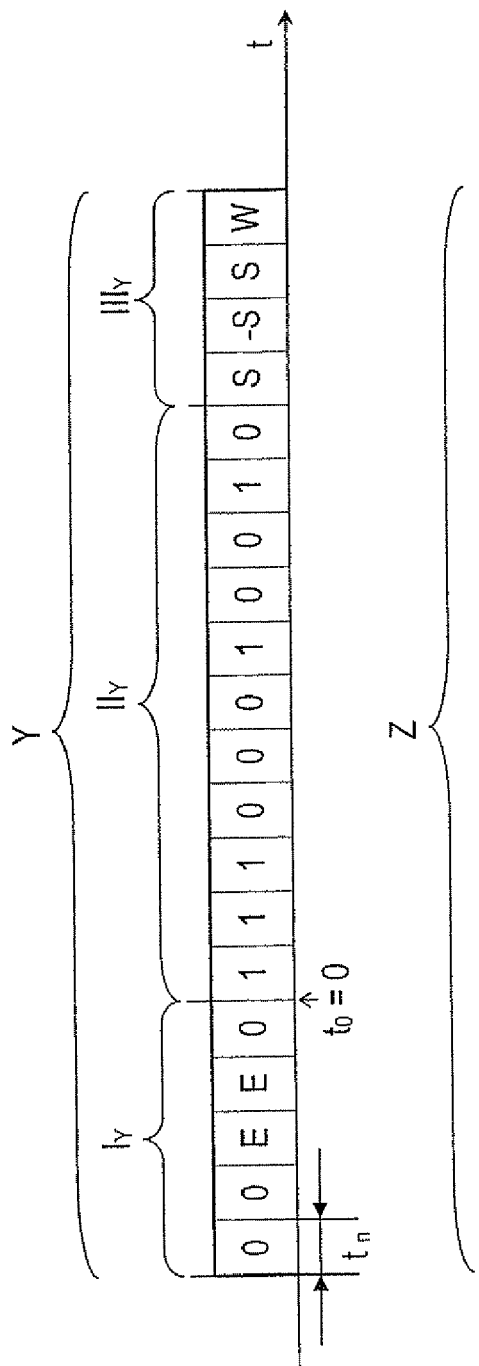
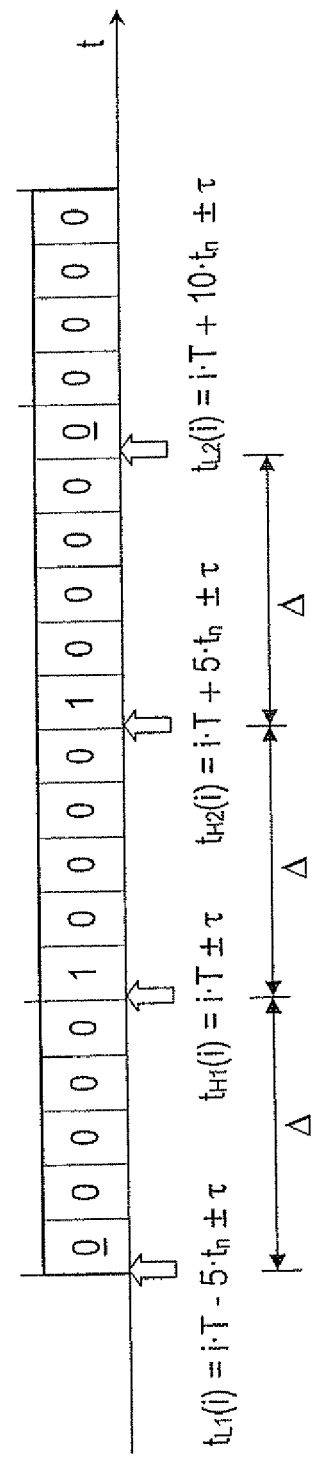
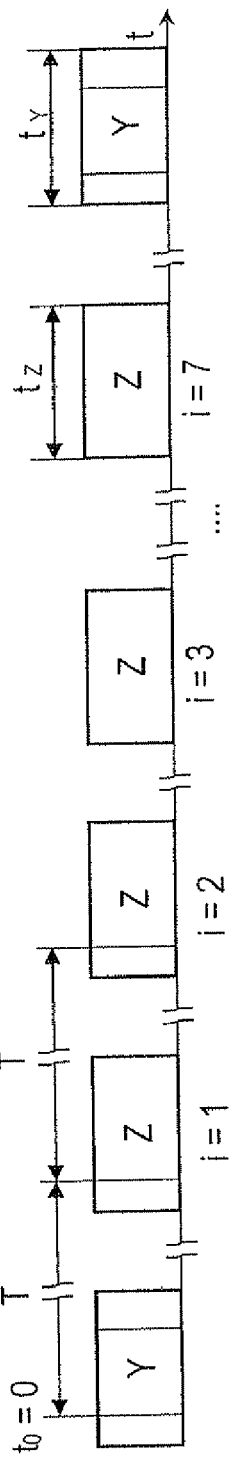
FIG. 3a
FIG. 3b
FIG. 3c

PROBE SYSTEM AND METHOD FOR OPERATING A PROBE SYSTEM

CROSS-REFERENCE TO RELATED APPLICATIONS

The present application claims priority to Application No. 10 2007 054 838.0, filed in the Federal Republic of Germany on Nov. 16, 2007, which is expressly incorporated herein in its entirety by reference thereto.

FIELD OF THE INVENTION

The present invention relates to a probe system, including a probe head having a stylus and a transceiver element, a wireless data transfer being possible between the probe head and the transceiver element. The present invention further relates to a method for operating such a probe system.

BACKGROUND INFORMATION

A probe system normally includes a mobile probe head and a stationary transceiver element. The probe head in the form of a momentary-contact switch having a deflectable stylus, which outputs a switch signal in response to a deflection out of its rest position or upon a contact of the stylus, is used, for example, for determining the position of workpieces that are clamped in machines, e.g., machine tools, that process material. In this context, the rest position of the stylus is understood to be a position in which the stylus has no contact with the workpiece to be probe-contacted. Upon contact of the stylus with the workpiece, the stylus is deflected out of its rest position, and an electrical sensor signal is generated by a suitable transducer if the deflection exceeds a specified probe threshold. The electrical sensor signal is generally converted into an infrared signal, so that a contactless and wireless signal transmission to the transceiver element of the probe system is thus achieved.

The infrared signals are converted again into electrical signals in the transceiver element. The transceiver element of the probe system is connected to an evaluation unit, to which the electrical signals are relayed and evaluated and ultimately made available, for example, to the control of the machine tool. The position of the workpiece to be measured can be determined by the control, based on the measured position of the machine tool part in question.

German Published Patent Application No. 10 2006 054 978 describes a probe system of the type indicated above, in which a control command is transmitted continually from a transmission element to a probe head, the probe head being held in an active state only upon reception of the control command. In this manner, the switch-on time of the probe head in the active state is minimized for the purpose of prolonging the service life of a battery in the probe head.

This arrangement of a probe system has the disadvantage that the probe head consumes a relatively large amount of electrical energy in the active state of measuring operation.

SUMMARY

Example embodiments of the present invention provide a probe system and a method for operating a probe system which, on the whole, permit reduced energy consumption by the probe head.

According to example embodiments of the present invention, a probe system includes a probe head having a stylus and a sensor element. Due to contact of the stylus, a sensor signal is able to be generated by the sensor element. The probe system further includes a transceiver element. The probe head and the transceiver element are configured such that a wireless data transfer is able to be produced between them, so that readiness information is transmittable from the probe head to the transceiver element. The readiness information is transmittable by two bit strings including high bits and low bits, the bit strings being transmittable following defined time intervals, and the second bit string having fewer high bits than the first bit string.

For example, the sensor elements may be implemented as pressure-sensitive sensor elements. In this instance, virtually without noticeable deflection travel of the sensor elements, as a result of pressure changes at the support points of the stylus, a sensor signal is generated in the probe head. Alternatively, optically acting sensor elements may also be used, in which the incidence of light on an optoelectronic component in the probe head is altered by optical components at the stylus, so that, in this manner, a sensor signal is generated.

Electromagnetic waves or signals, e.g., infrared signals, may be used for the wireless transfer of data. In the case of a wireless data transfer using infrared signals, infrared signals are transmittable from an infrared light source disposed at the probe head and at the transceiver element, respectively, and are convertible into electrical signals by optoelectronic receivers disposed at the transceiver element and at the probe head, respectively. The probe head, i.e., its transmitter unit, is powered by a network-independent current source which, for example, may be a battery, a capacitor, a fuel cell, etc.

In the following, a high bit is described as a bit whose level is high compared to the level of a low bit to be distinguished therefrom. For example, the high bit may have a normalized level of 100% or 1, while the low bit has a level of 0% or 0. Alternatively, however, the low bit may also have a normalized level, which represents an intermediate value of between 100% and 0% and, at any rate, is lower than the level of the high bit.

The high bits may be produced by the envelope curve of a plurality of electromagnetic signals recurring with a carrier frequency. An envelope curve should be understood to be that curve which connects adjacent maxima of the electromagnetic signals by the shortest path. In principle, the same observation may also be made for the low bits. When the low bits have a level of 0, then the envelope curve is a line on the zero level. If the low bits have a level which represents an intermediate value between 100% and 0%, then these low bits may also be produced by the envelope curve of a plurality of electromagnetic signals that recur with a carrier frequency. Correspondingly, high bits should be understood to be those bits which require more current or energy than low bits for the transmission. Therefore, the current source in the probe head must make more energy available for the transmission of high bits than for the transmission of low bits. For example, the probe head is configured such that no energy whatsoever is consumed for the transmitting of low bits if, for example, a light source is not energized during a low-bit phase.

The bit strings may be understood, for example, as data frames, in each case a longer rest phase or a pause existing between two bit strings within which no information, especially no readiness information, is transmittable. The pauses within which no readiness information is transmitted may be longer than each one of the two bit strings, e.g., 10 times longer, or, e.g., 100 times longer than each one of the two bit strings.

After the transmission of the first bit string, a plurality of second bit strings may be transmittable one after another following defined time intervals. For example, the time intervals may always be of equal length. The probe system may be configured such that after the first bit string has been transmitted, a series of five to fifteen further second bit strings are able to be transmitted.

In order to synchronize the two bit strings, the probe system may be configured such that the first bit string has a header, the header having more high bits than the second bit string. From the aspect of minimizing the energy demand, it may be provided that the second bit string has no more than two high bits.

For example, a first time window is determinable starting from an instant within the reception of the first bit string, one high bit of the second bit string being effectively receivable in the first time window. By effectively receivable or effectively received, it should be understood that the result of such a reception is that the probe head has transmitted its readiness information successfully and the measuring operation remains continuable.

Moreover, the probe system may be implemented such that, starting from an instant within the reception of the first bit string, a second time window is determinable in which one low bit of the second bit string is effectively receivable.

With regard to transmission reliability, particularly in the case of periodic interference signals, it may be provided that a plurality of high bits and a plurality of low bits of the second bit string are effectively receivable, and the time interval between the middles of the first time windows and of the second time windows is equal-sized.

Example embodiments of the present invention provide a method for operating a probe system having the components described herein. The method includes: transmitting the first bit string including high bits and low bits; and transmitting the second bit string including at least one high bit and low bits following a defined time interval, the second bit string having fewer high bits than the first bit string.

For example, after the transmission of the first bit string, a plurality of second bit strings are transmitted one after another following defined time intervals.

For example, after the second bit string or the second bit strings has/have been transmitted, a first bit string may be transmitted again, which may provide advantages with regard to the synchronization between probe head and transceiver element.

Further features and aspects of example embodiments of the present invention are described in more detail below with reference to the appended Figures.

BRIEF DESCRIPTION OF THE DRAWINGS

FIG. 3a shows a first bit string, by which readiness information is transmittable.

FIG. 3b shows a second bit string, by which the readiness information is transmittable.

FIG. 3c shows a time characteristic and the order of the transmitted bit strings.

DETAILED DESCRIPTION

Figure 1:
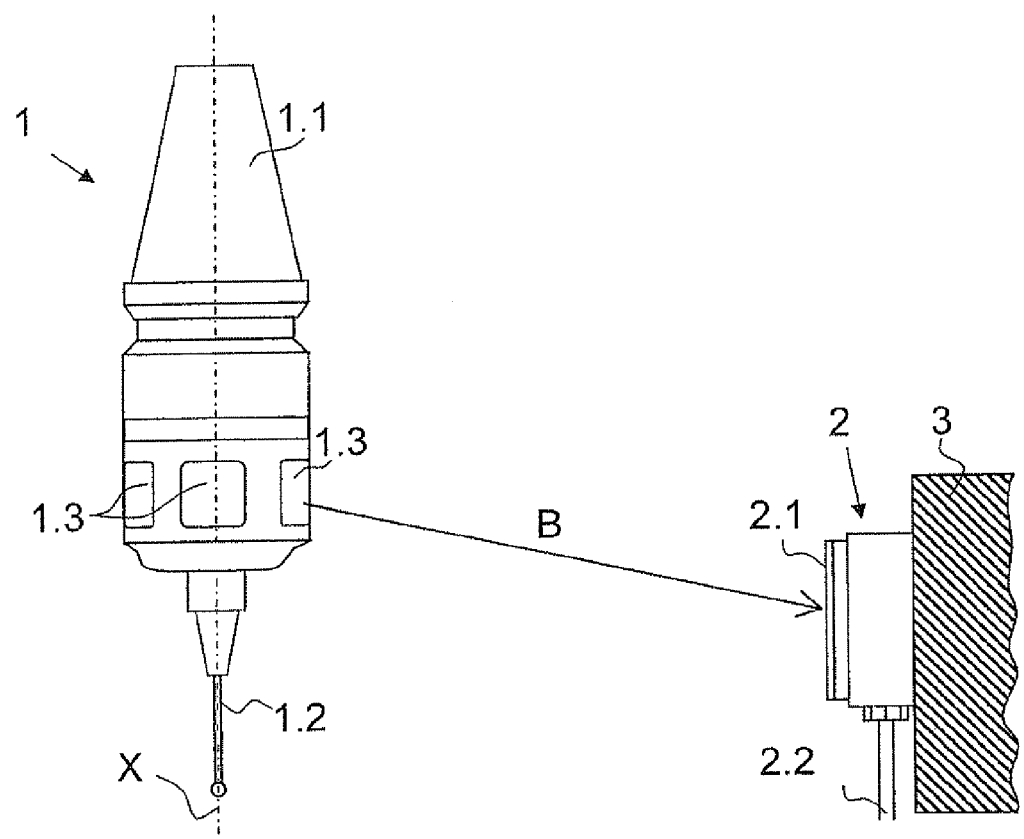
FIG. 1 is a side view of a probe system.

FIG. 1 illustrates a probe system that includes a probe head 1 and a transceiver element 2. Probe head 1 may be clamped into a spindle of a machine tool by a clamping cone 1.1. Longitudinal axis X of probe head 1 represents the center axis of clamping cone 1.1. Parallel and concentrically with respect to longitudinal axis X, a cylindrical stylus 1.2, having a probe-contact sphere at one end, is provided on probe head 1.

Figure 2:
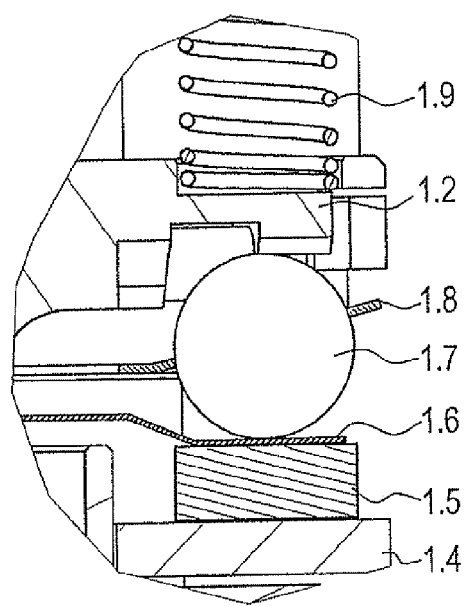
FIG. 2 is an enlarged view of a sensor element in a probe head.

FIG. 2 is an enlarged partial view of the interior of probe head 1. Placed on a printed circuit board 1.4 are a total of three pressure-sensitive sensor elements 1.5, of which only one is illustrated in FIG. 2. Arranged on the surface of each sensor element 1.5 is a diaphragm 1.6, which in each case is touched by a sphere 1.7, spheres 1.7 being fixed exactly at a predetermined position relative to sensor elements 1.5 by a holder 1.8. An arm of stylus 1.2, prestressed in each case by a spring 1.9, rests on each sphere 1.7. A battery is provided in probe head 1 to supply probe head 1 with energy.

Figure 4:
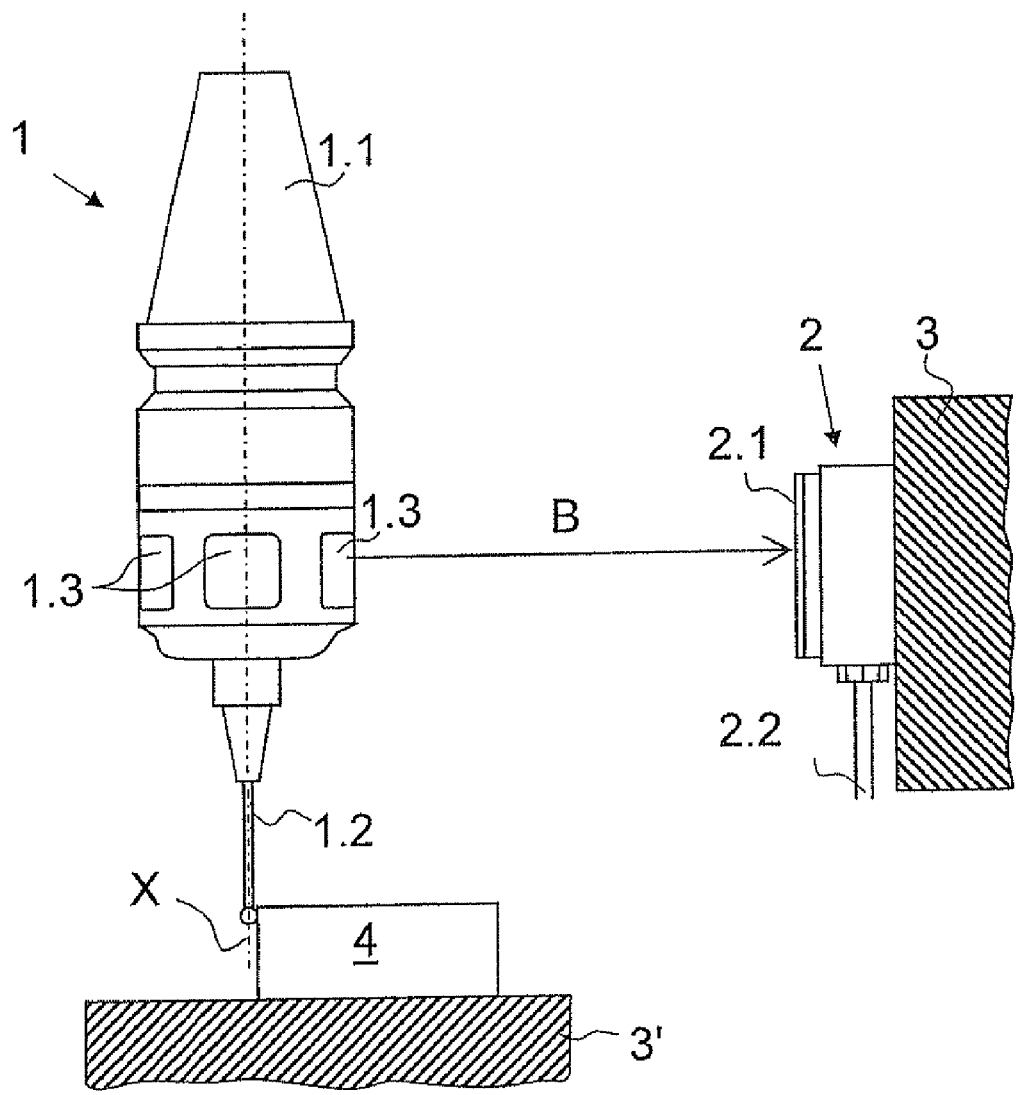
FIG. 4 is a side view of the probe system in a position in which the probe head, i.e., its stylus, is in contact with a workpiece.

Probe head 1 also has transmit/receive units 1.3 which are staggered over the periphery of probe head 1, as illustrated in FIGS. 1 and 4. In the example illustrated, six transmit/receive units 1.3 are provided on probe head 1, each offset by 60° along a circumferential line on probe head 1. In each instance, transmit/receive units 1.3 include an infrared light source powered by the battery in probe head 1. Infrared signals beamed into transmit/receive units 1.3 are also able to be received by transmit/receive units 1.3 of probe head 1, and then converted into electrical signals by optoelectronic receivers.

In the example illustrated, transceiver element 2 is secured to a stationary component 3 of the machine tool, and has a window 2.1 that is transparent for infrared light and behind which an infrared light source and an optoelectronic receiver are arranged. Transceiver element 2 is connected by a multi-core cable 2.2 to the network for its energy supply, and moreover is electrically connected to sequential electronics, e.g., to a numerical control of the machine tool.

Probe head 1 and transceiver element 2 are configured such that a wireless data transfer is possible between them, e.g., probe head 1 and transceiver element 2 are able to both transmit and receive infrared signals.

In measuring operation, probe head 1 is moved within a machining space of the machine tool or is swiveled about an axis that is aligned orthogonally with respect to longitudinal axis X. During measuring operation, readiness information B is transmitted continuously from the infrared light source of probe head 1 to transceiver element 2 to signal that the communication link to probe head 1 is working correctly. Readiness information B is thus sent by infrared signals in the form of infrared light pulses, and, e.g., may be transmitted here using two bit strings Y, Z, which in each case are transmitted following defined time intervals T, e.g., in a defined skew, from probe head 1 (see, e.g., FIG. 3c). Between the sending, e.g., between the transmission of in each case one bit string Y. Z is a pause in which no transmission of readiness information B takes place. In this context, the pauses are substantially longer than bit strings Y. Z themselves. The infrared light pulses are modulated with a carrier frequency. By definition, the level of the modulated infrared light pulses should be 100% or one. In the illustrated example, a high bit is formed by the envelope curve of a plurality of infrared light pulses. In this instance, transmitted bit strings Y. Z are modulated with a carrier frequency, which is, e.g., 5 MHz.

The measuring operation is maintained in response to the reception of readiness information B. e.g., bit strings Y, Z, by transceiver element 2. However, if the transmission of readiness information B is interrupted, e.g., by a disturbance edge, the machine tool is stopped.

FIG. 3a shows first bit string Y, which in the exemplary embodiment presented, includes a total of twenty bits. Bit string Y may be divided up into three areas $I_Y$, $II_Y$, $III_Y$ corresponding to the information to be transmitted. First area $I_Y$ includes information as to whether stylus 1.2 was transferred from the rest state to the displaced state since last bit string Y, Z was received. If yes, event bits E are set to "1," e.g., are implemented as high bits. The second area is also referred to as header $II_Y$. With its specific bit pattern, header $II_Y$ is used substantially for increasing transmission reliability and for synchronization purposes. The bit pattern of header $II_Y$ includes a total of eleven bits, of which five are high bits and six are low bits. Third area $III_Y$ includes information, first of all, as to whether stylus 1.2 is in the displaced state. The first three bits, e.g., status bits S of third area $III_Y$, are relevant in this connection. If stylus 1.2 is in the displaced state, first and third status bits S are implemented as high bits, whereas second status bit −S assumes the inverse value, e.g., 0, that is, is implemented as a low bit. In addition, third area $III_Y$ includes a battery-warning bit W which is in the form of a low bit as long as the battery in probe head 1 has a sufficient charge. For the case when the charge state of the battery moves below a predefined threshold, battery-warning bit W is transmitted as a high bit.

FIG. 3b shows second bit string Z which includes only two high bits, and therefore requires less energy to transmit than first bit string Y.

All bits within bit strings Y, Z have a time length $t_n$ of, e.g., 6.4 µs, so that viewed from the standpoint of time, each of the two bit strings Y, Z has altogether a length $t_Y$, $t_Z$ of, e.g., 128 µs.

Usually during the measuring of a workpiece 4, probe head 1 will move a comparatively long time in the machining space of the machine tool, until ultimately a probe contact actually takes place. During this time, readiness information B must be transmitted. For this purpose, initially first bit string Y is transmitted from probe head 1 to transceiver element 2, received there and evaluated. During the mere travel of probe head 1, the two event bits E are low bits. In the same manner, status bits S are in the form of low bits, while inverse status bit −S is a high bit. If the battery is in good condition, the warning bit will also be a low bit. In the case of a low bit to be transmitted, the infrared light source is not energized. In contrast to that, the battery must output electrical energy in order to transmit the—in the present case—five high bits of first bit string Y.

Probe head 1 has a timer, and furthermore, is configured such that it transmits second bit string Z following defined time interval T. In the exemplary embodiment described herein, time interval T=20 ms, for example. Thus, time interval T is approximately 156 times longer than length $t_Y$, $t_Z$ of the two bit strings Y, Z. Correspondingly, the pause between bit strings Y, Z or adjacent second bit strings Y, Z is thus comparatively long. Second bit string Z has fewer high bits than first bit string Y. In particular, second bit string Z has fewer high bits than header $II_Y$ of first bit string Y.

In transceiver element 2, initially first bit string Y is received, and by the evaluation of the specific bit sequence of header $II_Y$, it is determined that a satisfactory transfer of information between probe head 1 and transceiver element 2 is ensured, and in addition, that no probe contact exists. Furthermore, transceiver element 2 includes a timer. Instant to of the reception of the first bit of header $II_Y$ is first of all set to zero in this timer.

Upon the following first (i=1) reception of second bit string Z, it is first of all checked whether the two high bits of second bit string Z each lie within a predefined time window. For this purpose, a time value τ which defines the size of the time window is stored in transceiver element 2. The position of the time window is determined starting from instant to. Therefore, it is thus checked whether the high bits received lie within time windows $t_{H1}=T\pm\tau$ and $t_{H2}=T+5\cdot t_n+\tau$, respectively, where $T+t_0=T$, since 0=0. The middles of time windows $t_{H1}$ and $t_{H2}$ are situated at a time interval $\Delta=5\cdot t_n$.

To increase transmission reliability in spite of the reduced number of high bits in second bit string Z, it is further checked whether two low bits are received in further time windows $t_{L1}=T-5\cdot t_n\pm\tau 0$ and $t_{L2}=T+10\cdot t_n\pm\tau$, respectively. For this purpose, it is analyzed whether a signal received within time windows $t_{L1}$ and $t_{L2}$ has a level which falls below a predefined threshold level $\sigma_L$. If yes, it is assumed that the weak signal received comes from a lighting unit on the machine tool, for example, and therefore the transmission of the readiness information is correct. The middles of time windows $t_{L1}$ and $t_{L2}$ are also arranged at time interval $\Delta=5\cdot t_n$ with respect to the middles of respective adjacent time windows $t_{H1}$ and $t_{H2}$. By the utilization of low bits, at the same time interval $\Delta$, it is additionally ensured that no periodic interference signals, which coincidentally have intensity maxima with an interval $\Delta$, mistakenly bring about the reception of readiness information B. To achieve even higher transmission reliability, the average value of all received signal levels of all bits of second bit string Z is formed and compared to a further threshold level $\sigma_M$. In so doing, further threshold level $\sigma_M$ is predefined so that it is greater than threshold level $\sigma_L$. This check test makes it possible to determine how high the interference signals, e.g., the received interference level is over the entire time length of second bit string Z. If it turns out that the readiness information is being transmitted in an environment with unacceptably high interference signals, this leads to a machine stop. The checking of the average value of all received signal levels is subject to less strict conditions than the checking of the signals received within time windows $t_{L1}$ and $t_{L2}$.

Thus, the corresponding high bits and low bits can be effectively received only when they are received within time windows $t_{H1}$, $t_{H2}$, $t_{L1}$ and $t_{L2}$, an effective reception meaning that readiness information B is transmitted correctly, with the result that the measuring operation remains continuable.

After that—thus after second bit string Z is transmitted by probe head 1 following first bit string Y—in turn after the lapse of a further time interval T, a further second bit string Z (i=2) is sent as the next. Time windows $t_{H1}$, $t_{H2}$, $t_{L1}$ and $t_{L2}$ are determined at $t_{H1}=2\cdot T\pm\tau$, $t_{H2}=2\cdot T+5t_n\pm\tau$, $t_{L1}=2\cdot T-5\cdot t_n\pm\tau$ and $t_{L2}=2\cdot T+10t_n\pm\tau$, respectively. In the exemplary embodiment described, second bit string Z is transmitted a total of seven times (i=1, 2, 3, . . . 7) before first bit string Y is transmitted again. The result of the transmission of first bit string Y is that instant $t_0=0$ is then set again as renewed reference within the reception of first bit string Y, from which the time position of time windows $t_{H1}$, $t_{H2}$, $t_{L1}$ and $t_{L2}$ is again determined. Thus, the determination of time windows $t_{H1}$, $t_{H2}$, $t_{L1}$ and $t_{L2}$ may be described according to the following relationships:

$$t_{H1}(i)=i\cdot T\pm\tau,$$

$$t_{H2}(i)=i\cdot T+5\cdot t_n\pm\tau,$$

$$t_{L1}(i)=i\cdot T-5\cdot t_n\pm\tau,$$

$$t_{L2}(i)=i\cdot T+10\cdot t_n\pm\tau.$$

The size of time windows $t_{H1}$, $t_{H2}$, $t_{L1}$ and $t_{L2}$ and therefore time value τ is a function of the number i of consecutively transmitted second bit strings Z and the maximum possible drift in the timer. Based on weighing the possible savings in current and the transmission reliability, the number i may be between eight and ten. Therefore, after first bit string Y is transmitted, eight to ten second bit strings Z are thus transmittable one after another following defined time intervals T, e.g., a series of eight to ten further second bit strings are transmittable.

FIG. 4 shows a situation in which stylus 1.2 is contacting a workpiece 4 which is secured on a mounting table 3' of the machine tool. In this situation, a sensor signal is generated by sensor elements 1.5. The sensor signal leads—possibly also within a time interval T—to the immediate transmission of first bit string Y, the two event bits EE of bit string Y assuming the value 1, thus, in this relatively rare case, then being high bits. This information, e.g., this bit string Y is transmitted to transceiver element 2, and is relayed via cable 2.2 to sequential electronics. Thereupon, the position at which the workpiece is contacted is determined, and at the same time, the sequential electronics trigger a stop of the machine tool, so that probe head 1 is no longer moved relative to workpiece 4. Generally, machine tools have precise measuring devices which determine the spindle position, so that these measured values are used for determining the contact position.

The systems and methods described herein make it possible to achieve reliable transmission of the readiness information using comparatively few high bits to be transmitted. In particular, an extremely energy-saving operating method is attainable if, as in the exemplary embodiment described, the light source only has to be operated or energized for the transmission of the high bits.

What is claimed is:

1. A probe system, comprising
   a probe head having a stylus and a sensor, the sensor adapted to generate a sensor signal in response to contact of the stylus; and
   a transceiver device;
   wherein the probe head and the transceiver device are adapted to wirelessly transmit data between each other, the probe head configured to transmit readiness information to the transceiver device; and
   wherein the readiness information is transmittable by two bit strings including high bits and low bits, the bit strings transmittable following defined time intervals, a second bit string of the two bit strings having fewer high bits than a first bit string of the two bit strings.

2. The probe system according to claim 1, wherein the probe head is adapted to transmit, after the first bit string, a plurality of second bit strings one after another following defined time intervals.

3. The probe system according to claim 1, wherein the probe head is adapted to transmit the first bit string again after transmission of the second bit string.

4. The probe system according to claim 1, wherein the first bit string includes a header having more high bits than the second bit string.

5. The probe system according to claim 1, wherein, to synchronize the two bit strings, the first bit string includes a header having more high bits than the second bit string.

6. The probe system according to claim 1, wherein the second bit string has no more than two high bits.

7. The probe system according to claim 1, wherein starting from an instant within a reception of the first bit string, a first time window is determinable in which a high bit of the second bit string is effectively receivable.

8. The probe system according to claim 7, wherein starting from an instant within a reception of the first bit string, a second time window is determinable in which a low bit of the second bit string is effectively receivable.

9. The probe system according to claim 8, wherein a plurality of high bits and a plurality of low bits of the second bit string are effectively receivable, and a time interval between middles of the first time window and the second time window is equal-sized.

10. A method for operating a probe system including a probe head and a transceiver device, the probe head including a stylus and a sensor, the probe head and the transceiver device adapted to wirelessly transmit data between each other, readiness information, including two bit strings, transmittable from the probe head to the transceiver device, comprising:
    transmitting a first bit string of the two bit strings, including high bits and low bits; and
    transmitting a second bit string of the two bit strings, including at least one high bit and low bits, following a defined time interval;
    wherein the second bit string includes fewer high bits than the first bit string.

11. The method according to claim 10, wherein the transmitting of the second bit string includes transmitting, after the first bit string is transmitted, a plurality of second bit strings one after another following defined time intervals.

12. The method according to claim 10, further comprising transmitting the first bit string again after the transmitting of the second bit string.

13. The method according to claim 10, wherein the first bit string has a header having more high bits than the second bit string.

14. The method according to claim 10, wherein, to synchronize the two bit strings, the first bit string includes a header having more high bits than the second bit string.

15. The method according to claim 10, wherein the second bit string has no more than two high bits.

16. The method according to claim 10, further comprising determining, starting from an instant within reception of the first bit string, a time position of a first time window, a high bit of the second bit string being effectively received in the first time window.

17. The method according to claim 16, further comprising determining, starting from the instant within the reception of the first bit string, the time position of a second time window, a low bit of the second bit string being effectively received in the second time window.

18. The method according to claim 17, wherein a plurality of high bits and the low bits of the second bit string are effectively received, and a time interval between middles of the first time window and the second time window is equal-sized.

* * * * *